(12) United States Patent
Hirabayashi et al.

(10) Patent No.: US 9,567,933 B2
(45) Date of Patent: Feb. 14, 2017

(54) CONTROLLER AND CONTROL METHOD FOR ENGINES

(71) Applicant: MAZDA MOTOR CORPORATION, Hiroshima (JP)

(72) Inventors: Kazunori Hirabayashi, Hiroshima (JP); Naoya Mitsuishi, Hatsukaichi (JP); Shingo Okamoto, Hiroshima (JP); Masahiro Tateishi, Hatsukaichi (JP); Toshihiro Kamimura, Higashihiroshima (JP); Issei Oiso, Hiroshima (JP); Yoshiaki Enseki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 29 days.

(21) Appl. No.: 14/429,307

(22) PCT Filed: Mar. 21, 2013

(86) PCT No.: PCT/JP2013/001905
§ 371 (c)(1),
(2) Date: Mar. 18, 2015

(87) PCT Pub. No.: WO2014/045477
PCT Pub. Date: Mar. 27, 2014

(65) Prior Publication Data
US 2015/0226147 A1    Aug. 13, 2015

(30) Foreign Application Priority Data

Sep. 24, 2012   (JP) ................................. 2012-209784

(51) Int. Cl.
*F02D 41/24*   (2006.01)
*F02D 41/08*   (2006.01)
(Continued)

(52) U.S. Cl.
CPC ........... *F02D 41/2451* (2013.01); *F02D 29/02* (2013.01); *F02D 41/08* (2013.01); *F02D 41/403* (2013.01);
(Continued)

(58) Field of Classification Search
CPC .............. F02D 41/2441; F02D 41/2445; F02D 41/2448; F02D 41/2467; F02D 29/06; F02N 11/0866; F02N 2011/0885
See application file for complete search history.

(56) References Cited

U.S. PATENT DOCUMENTS 6,758,788 B2 *   7/2004   Itou ................... B60W 30/1819
                                                   477/11
6,898,512 B1 *   5/2005   Ritter ..................... F02D 29/04
                                                   123/350

(Continued)

FOREIGN PATENT DOCUMENTS

CN          1324735 A     12/2001
CN        101300416 A     11/2008
(Continued)

OTHER PUBLICATIONS

International Search Report; PCT/JP2013/001905; Apr. 16, 2013.
(Continued)

*Primary Examiner* — Stephen K Cronin
*Assistant Examiner* — Kevin R Steckbauer
(74) *Attorney, Agent, or Firm* — Studebaker & Brackett PC

(57) ABSTRACT

An alternator configured to acquire a motive force from an engine to generate electricity and a capacitor capable of storing therein the electricity generated by the alternator are provided. An electricity consumption amount required during learning is calculated, and a capacitor electricity amount is compared with the calculated electricity consumption
(Continued)

amount, and when the capacitor electricity amount is equal to or less than the calculated electricity consumption amount, the alternator is operated to generate electricity until the capacitor electricity amount is increased beyond the calculated electricity consumption amount. On the other hand, when the capacitor electricity amount is greater than the calculated electricity consumption amount, or when the capacitor electricity amount is increased beyond the calculated electricity consumption amount according to electricity generation by the alternator, the learning is performed while using the capacitor electricity without performing electricity generation by the alternator.

4 Claims, 6 Drawing Sheets

(51) Int. Cl.
*F02D 41/40* (2006.01)
*F02N 11/08* (2006.01)
*F02D 29/02* (2006.01)
*F02D 41/04* (2006.01)

(52) U.S. Cl.
CPC ......... *F02N 11/0866* (2013.01); *F02D 41/042* (2013.01); *F02D 41/2467* (2013.01); *F02N 2200/061* (2013.01); *Y02T 10/44* (2013.01)

(56) References Cited

U.S. PATENT DOCUMENTS

| | | | |
|---|---|---|---|
| 7,111,611 B1* | 9/2006 | Lyon | B60K 6/48 123/399 |
| 7,745,953 B2* | 6/2010 | Puccetti | F02N 11/003 307/10.1 |
| 7,881,857 B2* | 2/2011 | Samenfink | F02D 41/1454 123/299 |
| 8,179,103 B2* | 5/2012 | Doljack | F02N 11/0866 320/104 |
| 8,200,385 B2* | 6/2012 | Ando | B60K 1/02 180/65.265 |
| 8,229,653 B2* | 7/2012 | Ando | B60K 1/02 123/339.14 |
| 8,332,091 B2* | 12/2012 | Zeh | B60K 6/46 123/295 |
| 8,442,742 B2* | 5/2013 | Aso | F02D 41/0002 123/406.23 |
| 8,857,412 B2* | 10/2014 | Nistler | F02D 41/22 123/198 D |
| 9,145,658 B2* | 9/2015 | Kitamura | E02F 9/2292 |
| 9,174,525 B2* | 11/2015 | Caron | B60L 11/005 |
| 2001/0042648 A1 | 11/2001 | Wakashiro et al. | |
| 2002/0117338 A1* | 8/2002 | Itou | B60W 30/1819 180/54.1 |
| 2003/0164166 A1 | 9/2003 | Takeuchi et al. | |
| 2008/0246443 A1* | 10/2008 | Doljack | F02N 11/0866 320/167 |
| 2009/0299604 A1 | 12/2009 | Samenfink et al. | |
| 2009/0319109 A1* | 12/2009 | Ando | B60K 1/02 701/22 |
| 2009/0319158 A1* | 12/2009 | Ando | B60K 1/02 701/106 |
| 2010/0241335 A1* | 9/2010 | Aso | F02D 41/0002 701/103 |
| 2011/0118923 A1* | 5/2011 | Zeh | B60K 6/46 701/22 |
| 2015/0226147 A1 | 8/2015 | Hirabayashi et al. | |
| 2016/0108847 A1* | 4/2016 | Nakano | F02D 41/20 123/490 |
| 2016/0215721 A1* | 7/2016 | Nakano | F02D 41/2467 |

FOREIGN PATENT DOCUMENTS

| | | |
|---|---|---|
| JP | 2002-371903 A | 12/2002 |
| JP | 2003-254139 A | 9/2003 |
| JP | 2008-297121 A | 12/2008 |
| JP | 2009-062110 A | 3/2009 |
| JP | 2009-280033 A | 12/2009 |
| JP | 2010-144533 A | 7/2010 |
| JP | 2012-125049 A | 6/2012 |
| JP | 2012-125050 A | 6/2012 |
| JP | 2012-166618 A | 9/2012 |
| JP | 2012-179955 A | 9/2012 |
| JP | 2012166618 A * | 9/2012 ......... Y02T 10/6221 |
| WO | 2010/070446 A1 | 6/2010 |
| WO | 2014/045477 A1 | 3/2014 |

OTHER PUBLICATIONS

An Office Action; "Notification of Reasons for Refusal," issued by the Japanese Patent Office on Jan. 5, 2016, which corresponds to Japanese Patent Application No. 2012-209784 and is related to U.S. Appl. No. 14/429,307; with English language translation.

An Office Action; "Notification of Reasons for Refusal" issued by the Japanese Patent Office on Jul. 26, 2016, which corresponds to Japanese Patent Application No. 2012-209784; and is related to U.S. Appl. No. 14/429,307; with English language translation.

A First Office Action issued by the Chinese Patent Office on Jul. 5, 2016, which corresponds to Chinese Patent Application No. 201380048575.4 and is related to U.S. Appl. No. 14/429,307; with English language summary.

* cited by examiner

CONTROLLER AND CONTROL METHOD FOR ENGINES

TECHNICAL FIELD

The present invention relates to an engine control apparatus and method, and more specifically to an engine control apparatus and method for learning a characteristic of an engine control-related component such as a fuel injection valve, for use in engine control such as fuel injection control.

BACKGROUND ART

Heretofore, along with the progress of automotive electronics, for example, fuel injection control such as fuel injection amount control and fuel injection timing control has been performed by an electronic control system mainly composed of a microprocessor. A characteristic of a fuel injection valve (a relationship between an assignable injection time period to the fuel injection valve and an actual injection amount) for use in the fuel injection control has a variation due to individual differences among fuel injection valves, aging, etc. In this connection, there has been known a technique of learning a characteristic of a fuel injection valve so as to figure out such a variation to contribute to enhancing reliability of engine control, as described in the following Patent Literature 1. Further, the following Patent Literature 2 describes a technique of detecting a rough idling state in which an engine speed during an idling operation of an internal combustion engine unstably fluctuates with respect to a target engine speed.

During learning of a characteristic of a fuel injection valve, it is preferable to maintain an engine in a no-load state. This is because, if a load is applied to the engine, it results in an increase in fuel injection amount, or an increase in torsion of a crankshaft, which is likely to cause deterioration in learning accuracy.

Meanwhile, an engine is equipped with an alternator serving as an electricity generation device configured to be driven by rotation of a crankshaft. The alternator has a large operating resistance (load), wherein the load unpredictable fluctuates depending on an electricity generation amount. Thus, it is desirable to prevent the alternator from being activated during execution of the learning. However, the alternator can be activated during execution of the learning, for the following reason. That is, a fuel injection valve as a target of the learning requires electricity for driving it. Further, a microprocessor for executing the learning also consumes electricity by itself. During execution of the learning, such electricity is supplied by discharging a battery as an electricity source, so that a state of charge (SOC) in the battery is lowered during execution of the learning. Excessive lowering of the SOC accelerates degradation of the battery. Thus, in order to prevent degradation of the battery, a control operation is effected to generate electricity by the alternator during execution of the learning to supply the generated electricity to the battery. For the above reason, the alternator is activated during execution of the learning.

When the alternator is activated during execution of the learning, an operation of the alternator causes an increase in load on the engine, wherein the load unpredictable fluctuates. As a result, the learning accuracy deteriorates.

CITATION LIST

Patent Literature

Patent Literature 1: JP 2003-254139 A
Patent Literature 2: JP 2010-144533 A

SUMMARY OF INVENTION

It is therefore an object of the present invention to, during learning of a characteristic of an engine control-related component for use in engine control, allow an engine to be reliably maintained in a no-load state and kept in a stable state to thereby enhance learning accuracy.

In order to solve the above technical problem, the present invention provides an engine control apparatus for learning a characteristic of an engine control-related component for use in engine control. The engine control apparatus comprises: an electricity generation device configured to acquire a motive force from an engine to generate electricity; a capacitor capable of storing therein the electricity generated by the electricity generation device; an electricity consumption calculation device configured to calculate an electricity consumption amount required by a vehicle during execution of the learning; a comparison device configured to compare an amount of electricity stored in the capacitor with the electricity consumption amount calculated by the electricity consumption calculation device; a required electricity ensuring device configured to, when a result of the comparison by the comparison device indicates that the amount of electricity stored in the capacitor is equal to or less than the calculated electricity consumption amount, cause the electricity generation device to generate electricity until the amount of electricity stored in the capacitor is increased beyond the calculated electricity consumption amount; and a learning execution device configured to, when the result of the comparison by the comparison device indicates that the amount of electricity stored in the capacitor is greater than the calculated electricity consumption amount, or when the amount of electricity stored in the capacitor is increased beyond the calculated electricity consumption amount by the required electricity ensuring device, execute the learning while using electricity stored in the capacitor so as to avoid the electricity generation by the electricity generation device.

In order to solve the above technical problem, the present invention also provides an engine control method for learning a characteristic of an engine control-related component for use in engine control. The engine control method comprises: an electricity consumption calculation step of calculating an electricity consumption amount required by a vehicle during execution of the learning; a comparison step of comparing an amount of electricity stored in a capacitor with the calculated electricity consumption amount, wherein the capacitor is configured to store therein electricity generated by an electricity generation device configured to acquire a motive force from an engine to generate electricity; a required electricity ensuring step of, when a result of the comparison indicates that the amount of electricity stored in the capacitor is equal to or less than the calculated electricity consumption amount, causing the electricity generation device to generate electricity until the amount of electricity stored in the capacitor is increased beyond the calculated electricity consumption amount; and a learning execution step of, when the result of the comparison indicates that the amount of electricity stored in the capacitor is greater than the calculated electricity consumption amount, or when the amount of electricity stored in the capacitor is increased beyond the calculated electricity consumption amount as a result of the electricity generation by the electricity generation device, executing the learning while using electricity stored in the capacitor so as to avoid the electricity generation by the electricity generation device.

The present invention can, during learning of a characteristic of an engine control-related component for use in engine control, allow an engine to be reliably maintained in a no-load state and kept in a stable state to thereby enhance learning accuracy.

These and other objects, features, and advantages of the present invention will become apparent upon reading of the following detailed description along with the accompanying drawings.

DESCRIPTION OF EMBODIMENTS

The present invention will now be described in detail through an embodiment thereof.

(1) Overall Configuration

Figure 1:
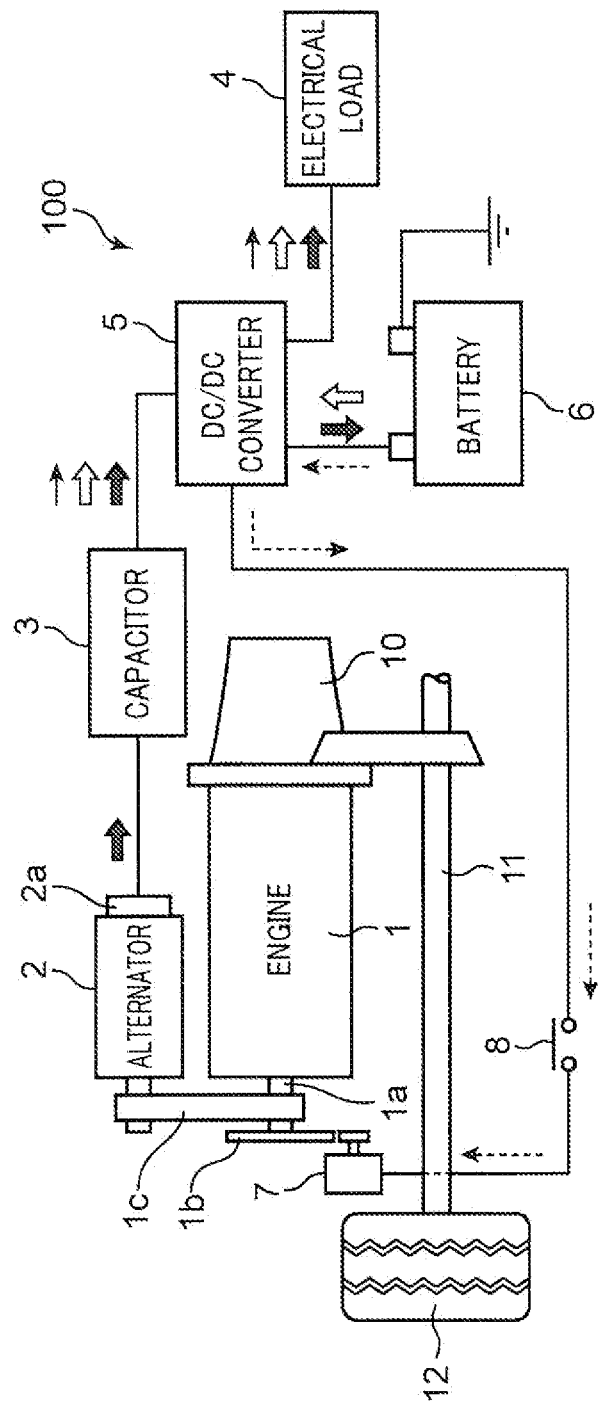
FIG. 1 is a block diagram of an engine and an electricity supply system which pertain to one embodiment of the present invention.

FIG. 1 is a block diagram of an engine 1 and an electricity supply system 100 which pertain to one embodiment of the present invention. As illustrated in FIG. 1, a vehicle pertaining to this embodiment is equipped with: an engine (in this embodiment, diesel engine) 1 serving as a traveling drive source; an alternator 2 (equivalent to "electricity generation device" set forth in the appended claims) configured to acquire a motive force from the engine 1 to generate electricity; a capacitor 3 electrically connected to the alternator 2 to store therein the electricity generated by the alternator 2; an electrical load 4; a DC-DC converter 5; a battery 6 serving as an electricity source; and a starter motor 7 capable of giving a rotational force to the engine 1 during start of the engine 1. Examples of the electrical load 4 include an air conditioner 21 (see FIG. 2), an audio device, a headlight, a fuel injection valve 20 (see FIG. 2), and a fuel feed pump 9 (see FIG. 2) for feeding fuel to the fuel injection valve 20. The DC-DC converter 5 is interposed between the electrical load 4 and the capacitor 3. The battery 6 is electrically connected to the DC-DC converter 5.

The starter motor 7 is electrically connected to the DC-DC converter 5 via a starter relay 8. The starter relay 8 is turned ON during start of the engine 1, and, at any other time, maintained in an OFF state. When the starter relay 8 is turned ON, electricity charged in the battery 6 is supplied to the starter motor 7 via the DC-DC converter 5 (see the arrowed broken line in FIG. 1), so that the starter motor 7 is driven by the supplied electricity. The starter motor 7 is operable to forcibly rotate a ring gear 1b integrally attached to an output shaft (crankshaft) 1a of the engine 1 to thereby give a rotational force to the engine 1.

The vehicle pertaining to this embodiment is a so-called "vehicle with an idling stop function" which is configured to automatically stop the engine 1 under a given condition, even when an ignition switch is in an ON state. Therefore, the starter motor 7 is driven not only when the ignition switch is switched from an OFF state to the ON state, but also when the engine 1 in an automatically stopped state is restarted. For this reason, electricity in the battery 6 is frequently used.

A transmission 10 is coupled to the engine 1. A drive axle 11 and wheels 12 are provided on an output side of the transmission 10. During acceleration of the vehicle, an output torque of the engine 1 is transmitted to the drive axle 11 and the wheels 12 via the transmission 10, so that the wheels 12 are rotated. On the other hand, during deceleration of the vehicle, the engine 1 is rotated by the wheels 12 and the drive axle 11 which are rotating by inertia.

In order to acquire a motive force from the engine 1, the alternator 2 is coupled to the output shaft 1a of the engine 1 via a winding transmission member 1c such as a belt, in such a manner as to be driven by rotation of the output shaft 1a. Specifically, the alternator 2 comprises a rotor (illustration is omitted) configured to be rotated interlockingly with the output shaft 1a of the engine 1, and a stator coil (illustration is omitted) disposed around the rotor. The rotor is provided with a field coil wound therearound to generate a magnetic field. During electricity generation by the alternator 2, a current is applied to the field coil to generate a magnetic field, and the rotor is rotated within the magnetic field, so that an induced current is generated in the stator coil.

The alternator 2 incorporates a rectifier 2a capable of converting generated AC electricity into DC electricity. Electricity generated by the alternator 2 is converted into DC through the rectifier 2a, and then supplied to the capacitor 3.

The capacitor 3 is a variable-voltage type electric double layer capacitor (EDLC) capable of being charged to a voltage from 12V to up to 25V. Differently from a secondary battery such as the battery 6, this type of capacitor 3 is configured to store electricity by means of physical adsorption of electrolyte ions, so that it has a property capable of having a low internal resistance and achieving relatively rapid charge and discharge.

The battery 6 is a secondary battery composed, for example, of a lead battery commonly used as an in-vehicle battery. This type of battery 6 is configured to store electric energy by means of a chemical reaction, so that it has a property capable of having a large charging capacity although it is unsuited to rapid charge and discharge.

Electricity generation by the alternator 2 is intensively performed during deceleration of the vehicle, and resulting electricity (regenerative electricity) is charged in the capacitor 3 once. The charged electricity in the capacitor 3 having a voltage of up to 25V is lowered to 12V through the DC-DC converter 5, and then supplied to the electrical load 4 and/or the battery 6 (see the arrowed black line in FIG. 1).

An electricity supply system 100 illustrated in FIG. 1 is configured such that, when the voltage (from 12V to up to 25V) of the capacitor 3 is greater than a voltage (12V at minimum) of the battery 6, a current flows from the side of the capacitor 3 to the side of the electrical load 4 and the battery 6.

Excessive lowering of a state of charge (SOC) in the battery 6 accelerates degradation of the battery 6. Thus, in order to prevent degradation of the battery 6, when the SOC in the battery 6 becomes less than a given value, electricity is supplied from the capacitor 3 to the battery 6. Along with this, the alternator 2 generates electricity and supplies the generated electricity to the capacitor 3. That is, in order to maintain the SOC in the battery 6 at a given value or more to thereby protect the battery 6 against degradation, the alternator 2 frequently performs electricity generation. Moreover, the electricity in the battery 6 is frequently used for the idling stop function, as mentioned above, so that the alternator 2 will more frequently perform electricity generation.

In a situation where the vehicle is subjected to deceleration with a high frequency, the alternator 2 frequently generates electricity, and the capacitor 3 is charged with the generated electricity within a limited deceleration period of time, so that electricity required during traveling of the vehicle can be almost fully compensated by regenerative electricity. For example, when the vehicle travels in an urban area, acceleration and deceleration of the vehicle are frequently repeated. Thus, in many cases, before electricity charged in the capacitor 3 is largely lowered, the vehicle is decelerated again and resulting regenerative electricity is supplied to the capacitor 3. Therefore, it becomes possible to almost eliminate a need to supply electricity to the electrical load 4 by discharging the battery 6. The reason is because the electricity supply system 100 pertaining to this embodiment is configured such that, when the voltage (from 12V to up to 25V) of the capacitor 3 is greater than a voltage (12V at minimum) of the battery 6, electricity in the capacitor 3 is used in the electrical load 4, in priority to electricity in the battery 6 (no electricity is supplied from the battery 6 to the electrical load 4). For example, the capacitor 3 is configured to be almost fully charged when the alternator 2 performs electricity generation for 10 seconds or less (several seconds).

On the other hand, during acceleration of the vehicle, in order to reduce an operating resistance (load) of the alternator 2 acting on the engine 1, electricity generation by the alternator 2 is not performed, basically. In this situation, power consumption of the electrical load 4 is compensated by electricity charged in the capacitor 3, and, when needed, electricity discharged from the battery 6 (via the DC-DC converter 5) (see arrowed white line in FIG. 1).

As above, the electricity supply system 100 pertaining to this embodiment is a dual storage type electricity supply system utilizing the capacitor 3 and the battery 6 having different properties.

(2) Electronic Control System

Figure 2:
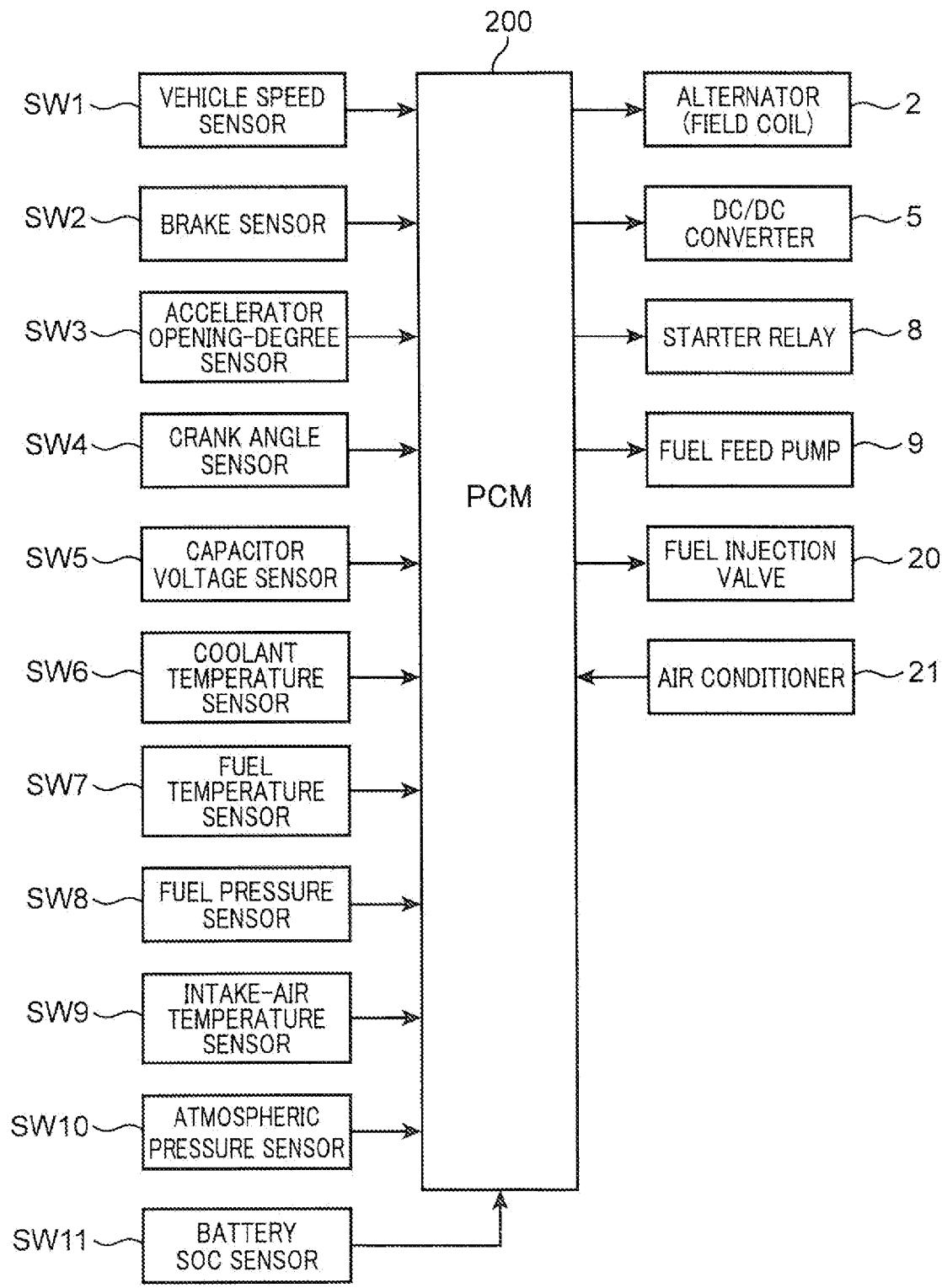
FIG. 2 is a block diagram of a vehicle electronic control system mainly composed of a PCM.

FIG. 2 is a block diagram of a vehicle electronic control system mainly composed of a power-train control module (PCM) 200. As is well known, the PCM 200 is a microprocessor comprising a CPU, a ROM and a RAM, and is equivalent to "electricity consumption calculation device", "comparison device", "required electricity ensuring device" and "learning execution device" set forth in the appended claims.

A variety of information from various sensors provided in the vehicle is input into the PCM 200. That is, the vehicle is provided with: a vehicle speed sensor SW1 for detecting a vehicle traveling speed (vehicle speed); a brake sensor SW2 for detecting a depression force of a non-illustrated brake pedal (brake depression force); an accelerator opening-degree sensor SW3 for detecting a depression amount of a non-illustrated accelerator pedal (accelerator opening degree); a crank angle sensor SW4 for detecting a rotational speed of the output shaft 1a of the engine 1 (engine speed); a capacitor voltage sensor SW5 for detecting a voltage (inter-terminal voltage) of the capacitor 3 and thus detecting an amount of capacitor electricity (electricity stored in the capacitor 3); an engine coolant temperature sensor SW6 for detecting an engine coolant temperature; a fuel temperature sensor SW7 for detecting a temperature of fuel to be injected from the fuel injection valve 20 provided in each cylinder; a fuel pressure sensor SW8 for detecting s pressure of fuel (fuel pressure) to be injected from the fuel injection valve 20; an intake-air temperature sensor SW9 for detecting a temperature of intake air (temperature of outside air); an atmospheric pressure sensor SW10 for detecting an atmospheric pressure; and a battery SOC sensor SW11 for detecting the SOC in the battery 6. These sensors SW1 to SW11 are electrically connected to the PCM 200.

The PCM 200 is further electrically connected to the field coil of the alternator 2, the DC-DC converter 5, the starter relay 8, the fuel feed pump 9 and the fuel injection valve 20, and configured to output a driving control signal to each of these components. Further, an on-off signal of the air conditioner 21 is input from the air conditioner 21 into the PCM 200.

The PCM 200 is operable, based on a variety of information input from the sensors SW1 to SW11, to control combustion of the engine 1 so as to obtain a torque suitable for a vehicle traveling state; to control an electricity generation amount of the alternator 2 depending on the vehicle traveling state; and to control a supply of electricity generated by the alternator 2, to the electrical load 4 and/or the battery 6.

The vehicle pertaining to this embodiment is a vehicle with an idling stop function, as mentioned above. Thus, the PCM 200 has a function of automatically stopping the engine 1 under a given condition, and restarting the engine 1 in an automatically stopped state.

The PCM 200 further has a function of learning a characteristic of the fuel injection valve 20 (a relationship between an assignable injection time period to the fuel injection valve 20 and an actual injection amount) for use in the fuel injection control of the engine 1, as described below.

(3) Specific Control

Figure 3:
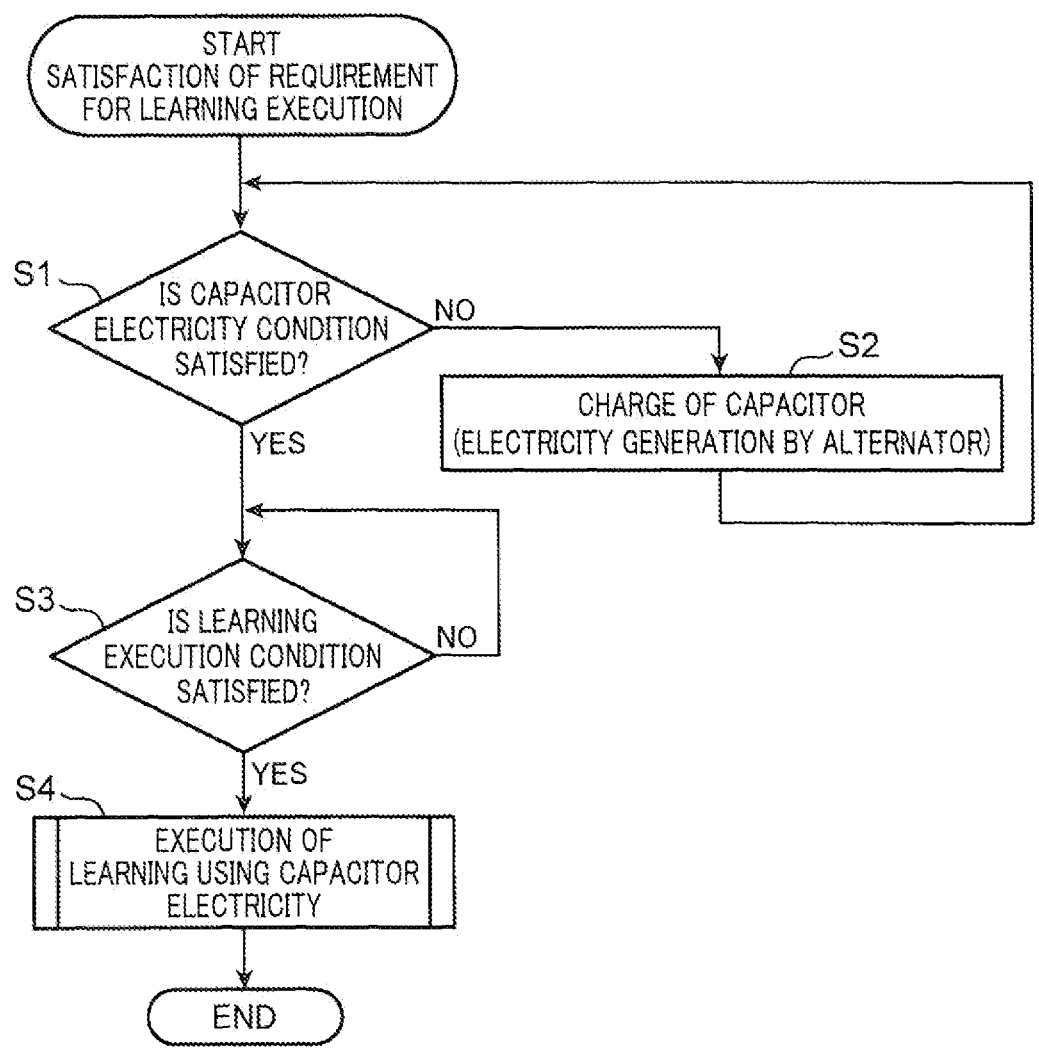
FIG. 3 is a flowchart of a learning execution control to be performed by the PCM.

With reference to the flowchart in FIG. 3, an operation of a learning execution control to be performed by the PCM 200 will be described.

<Satisfaction of Requirement for Execution of Learning>

The learning execution control is started in response to satisfaction of a given requirement for execution of the learning.

Specifically, for example, when all of the following conditions are satisfied: a condition that the engine coolant temperature specified by information from the coolant temperature sensor SW6 is maintained constant within a given range; a condition that the fuel temperature specified by information from the fuel temperature sensor SW7 is maintained constant within a given range; a condition that the outside-air temperature specified by information from the intake-air temperature sensor SW9 is maintained constant within a given range; and a condition that the SOC in the battery 6 specified by information from the battery SOC sensor SW11 is equal to or greater than a given value, and when a traveling distance becomes greater than a given value, or an aftermentioned difference between an average value of actual engine speeds of all cylinders and a target idling speed (see FIG. 5) becomes greater than a given value, the PCM 200 determines that the requirement for execution of the learning is satisfied.

<Satisfaction of Capacitor Electricity Condition>

Upon start of the learning execution control in response to the determination that the requirement for execution of the learning is satisfied, the PCM 200 determines, in Step S1, whether or not a capacitor electricity condition is satisfied.

Specifically, based on a usage amount of electricity in the vehicle, the PCM 200 calculates an electricity consumption amount required by the vehicle during execution of the learning in the aftermentioned step S4 (an operation as "electricity consumption calculation device", i.e., "electricity consumption calculation step"). In this regard, the electricity consumption amount required by the vehicle during execution of the learning includes: an electricity amount required for executing the learning (e.g., an electricity amount required for driving the fuel injection value 20 as a target of the learning, an electricity amount to be consumed directly by the PCM 200 performing the learning, and an electricity amount required for the crank angle sensor SW4 to detect data for the learning); an electricity amount to be used by another general electrical load 4 (e.g., electricity amounts used by an audio device and a headlight).

Then, the PCM 200 compares an amount of capacitor electricity (electricity stored in the capacitor 3) specified by information from the capacitor voltage sensor SW5, with the calculated electricity consumption amount (an operation as "comparison device", i.e., "comparison step"). As a result, when the capacitor electricity amount (Qc) is greater than the calculated electricity consumption amount (Qo) (Qc>Qo), the PCM 200 determines that the capacitor electricity condition is satisfied, and the routine proceeds to Step S3. On the other hand, when the capacitor electricity amount (Qc) is equal to or less than the calculated electricity consumption amount (Qo) (Qc≤Qo), the PCM 200 determines that the capacitor electricity condition is not satisfied, and the routine proceeds to Step S2.

In the Step S2, the PCM 200 operates to cause the alternator 2 to generate electricity to thereby charge the capacitor 3, until it is determined, in the Step S1, that the capacitor electricity condition is satisfied, i.e., the amount of capacitor electricity (electricity stored in the capacitor 3) specified by information from the capacitor voltage sensor SW5 is increased beyond the calculated electricity consumption amount (an operation as "required electricity ensuring device", i.e., "required electricity ensuring step"). Although the electricity generation by the alternator 2 is preferably performed during deceleration of the vehicle, it may be performed during acceleration of the vehicle, depending on the situation.

The capacitor 3 is capable of achieving relatively rapid charge and discharge, so that the capacitor 3 is fully charged by performing the electricity generation for a short period of time (e.g., several seconds), and thereby the capacitor electricity amount is increased beyond the calculated electricity consumption amount.

The situation where the capacitor electricity amount is greater than the calculated electricity consumption amount means that the electricity consumption amount required by the vehicle during execution of the learning in the step S4 is ensured in the capacitor 3. Thus, even when the electricity consumption amount required by the vehicle during execution of the learning in the step S4 is entirely compensated only by the capacitor electricity, the voltage of the capacitor 3 never falls below 12V, i.e., the voltage of the capacitor 3 never becomes less than 12V as a minimum voltage of the battery 6.

<Satisfaction of Learning Execution Condition>

In the Step S3, the PCM 200 determines whether or not a learning execution condition is satisfied.

Specifically, for example, when all of the following conditions are satisfied: the condition that the engine coolant temperature is maintained constant within a given range; the condition that the fuel temperature is maintained constant within a given range; the condition that the outside-air temperature is maintained constant within a given range; and the condition that the SOC in the battery 6 is equal to or greater than a given value, as with the determination on the satisfaction of the requirement for execution of the learning, and when all of the following conditions are further satisfied: a condition that the vehicle speed specified by information from the vehicle speed sensor SW1 is zero; a condition that the brake depression force specified by information from the brake sensor SW2 is equal to or greater than a given value; a condition that the accelerator opening degree specified by information from the accelerator opening-degree sensor SW3 is zero; a condition that the engine speed specified by information from the crank angle sensor SW4 is stably maintained at a given idling speed; a condition that the air conditioner 21 is in an OFF state; and a condition that the alternator 2 is not activated (the electricity generation by the alternator 2 is not performed), the PCM 200 determines that the learning execution condition is satisfied.

As a result, when it is determined that the learning execution condition is satisfied, the PCM 200 executes, in Step S4, the learning using the capacitor electricity (an operation as "learning execution device", i.e., "learning execution step").

As mentioned above, the electricity supply system 100 pertaining to this embodiment is configured such that, when the voltage of the capacitor 3 is greater than the voltage of the battery 6, a current flows from the side of the capacitor 3 to the side of the electrical load 4 and the battery 6, i.e., electricity in the capacitor 3 is used in the electrical load 4, in priority to electricity in the battery 6 (no electricity is supplied from the battery 6 to the electrical load 4). Conversely, when the voltage of the capacitor 3 is lowered to a value less than the voltage of the battery 6 as a result of using electricity of the capacitor 3 on a priority basis, the use of electricity of battery 6 is started. Then, in order to maintain the SOC in the battery 6 at a given value or more to protect the battery 6 against degradation, the alternator 2 starts to perform electricity generation. If the alternator 2 performs electricity generation during execution of the learning in the Step S4, a load applied to the engine 1 is increased due to the operation of the alternator 2, wherein the load unpredictably fluctuates, so that the engine 1 is not maintained in a stable state, causing deterioration in learning accuracy.

Therefore, in this embodiment, in order to keep the alternator 2 from performing electricity generation during execution of the learning in the Step S4, satisfaction or non-satisfaction of the capacitor electricity condition is determined in the Step S1 to ascertain that an amount of electricity stored in the capacitor 3 is greater than an electricity consumption amount required by the vehicle during execution of the learning in the Step S4 (i.e., the electricity consumption amount required by the vehicle during execution of the learning in the Step S4 is ensured in the capacitor 3). Thus, even when only electricity in the capacitor 3 is used during execution of the learning, the voltage of the capacitor 3 is never lowered beyond 12V as a minimum voltage of the battery 6. Therefore, the learning in the Step S4 is executed without performing (while avoiding) electricity generation by the alternator 2.

<Execution of Learning>

Figure 4:
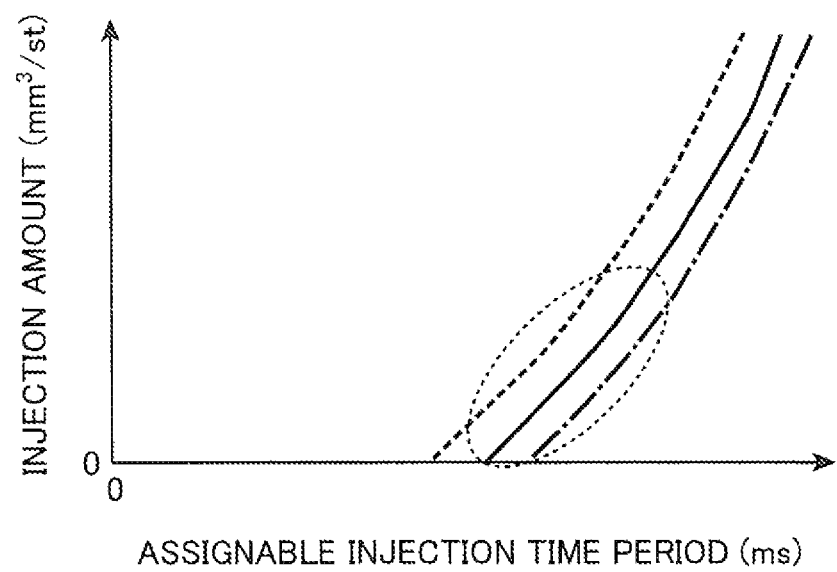
FIG. 4 is an explanatory graph of a learning operation to be performed in the learning execution control.
Figure 5:
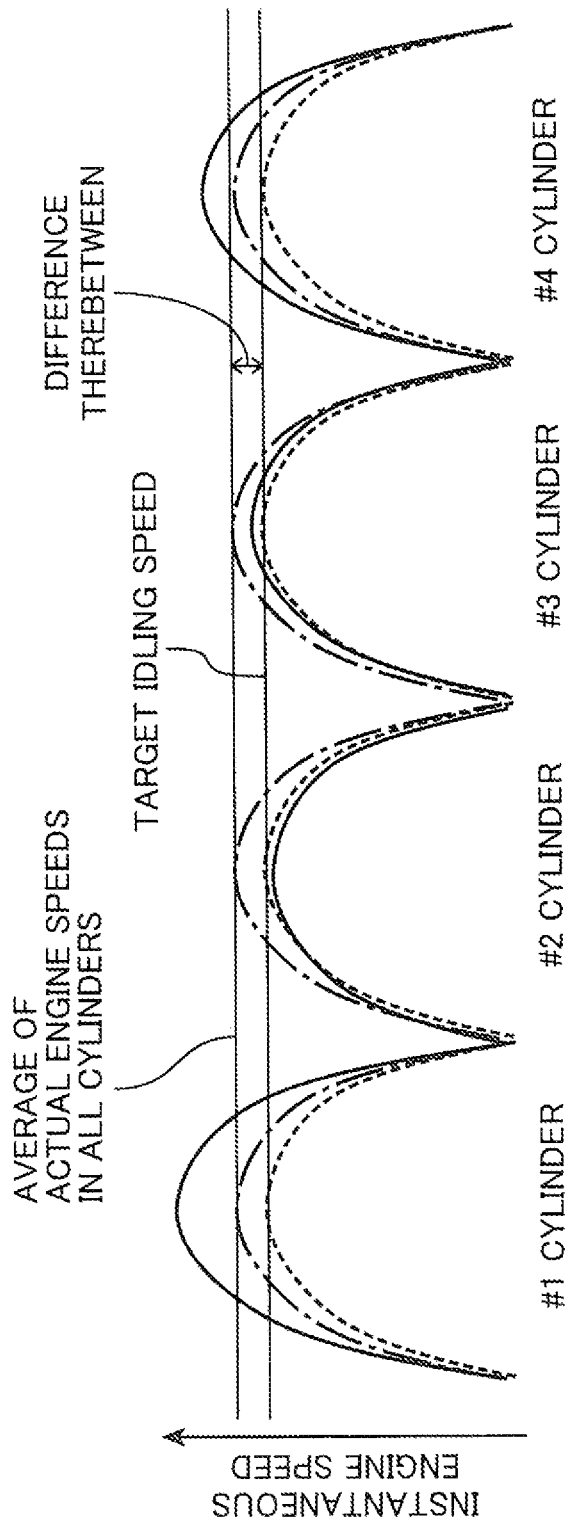
FIG. 5 is an explanatory graph of the learning operation.
Figure 6:
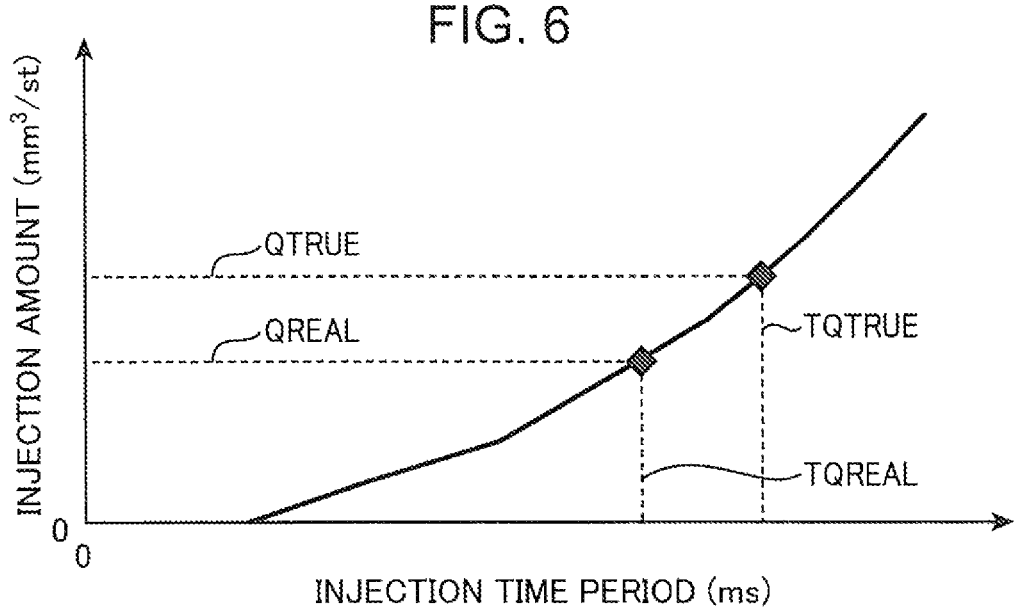
FIG. 6 is an explanatory graph of the learning operation.

With reference to FIGS. 4 to 6, a learning operation to be performed in the Step S4 will be outlined below. In the Step S4, the PCM 200 operates to learn a characteristic of the fuel injection valve 20 (a relationship between an assignable injection time period to the fuel injection valve 20 and an actual injection amount) for use in the fuel injection control of the engine 1. The learning to be performed in the Step S4 will be referred to as "multistage minute injection amount learning".

[A] Purpose

In the engine 1 pertaining to this embodiment, in order to realize improvement in exhaust gas emissions, fuel economy, drivability and NVH (Noise, Vibration and Harshness) at high levels, multistage injection (e.g., fuel injection comprising a pre-injection, a main injection and an after injection) for the purpose of combustion control is performed. In the multistage injection, an injection amount per injection is as small as 1 to 5 mm$^3$/st, for example, so that it is important to accurately achieve such minute injection. However, due to individual differences among fuel injection valves 20, aging, etc., a variation occurs in minute injection amount.

That is, as illustrated in FIG. 4, an injection amount is controlled by increasing or reducing an assignable injection time period (e.g., pulse width) to the fuel injection valve 20. However, even when the same assignable injection time period is assigned, a variation will occur in actual injection amount. In FIG. 4, the solid line represents a relationship between an assignable injection time period and an injection amount in a given reference fuel injection valve set in a vehicle development stage. Even if the same injection time period is assigned with respect to such a characteristic of the reference fuel injection valve, depending on the fuel injection valve 20, fuel is injected in a relatively large amount as indicated by the broken line or injected in a relatively small amount as indicated by the one-dot chain line. Such a variation prominently appears in a region where the injection amount is small, e.g., in a circled area in FIG. 4.

Therefore, with a view to figuring out such a variation to contribute to enhancing reliability of fuel injection control and thus reliability of engine control, it is intended to learn the characteristic of the fuel injection valve 20 to ensure accuracy of a multistage minute injection amount.

[B] Method of Learning

In the multistage minute injection amount learning, setting of a learning-only injection pattern (setting of a given number of injection stages, a given injection amount, a given injection timing and a given fuel pressure) is performed when the engine 1 is in an idling state and in a no-load state. In this learning, a required injection amount is injected in such a manner as to be equally divided by the number of injection stages (e.g., among a pre-injection, a main injection and an after injection, the injection amount is set to the same value). Further, in order to ensure learning accuracy, the learning is performed in an environment where the engine coolant temperature, the fuel temperature, the intake-air temperature, electrical and mechanical loads, atmospheric pressure, etc., are maintained constant. As can be understood from the learning execution condition in the Step S3, the learning in the Step S4 is performed when the vehicle is stopped, and the engine 1 is in the idling state.

A reference injection time period of the reference fuel injection valve preliminarily set to obtain a target idling speed is assigned to the fuel injection valve 20 in each cylinder, and a resulting engine speed (actual engine speed) is detected with respect to each cylinder. In this regard, a difference between the actual engine speed and the target idling speed relies on a characteristic of each of the fuel injection valves 20 (a relationship between an assignable injection time period to the fuel injection valve 20 and an actual injection amount). Then, the assignable injection time period is adjustingly increased or reduced with respect to each fuel injection valve 20 so as to allow the actual engine speed to become equal to the target idling speed. An adjustment amount of the assignable injection time period is a learning value. Then, the learning value is obtained with respect to each fuel injection valve 20 (i.e., with respect to each cylinder), and with respect to each of a plurality of different fuel pressures.

In FIG. 5, an actual engine speed detected in each cylinder when fuel is injected from each fuel injection valve 20, an average value of the actual engine speeds in all cylinders, and the target idling speed, are indicated, respectively, by the solid line, the one-dot chain line and the broken line.

Conversion of the injection amount to the injection time period means that the injection time period can be calculated from the injection amount and the fuel pressure. As illustrated in FIG. 6, at a certain fuel pressure, an assignable injection amount (QREAL) is converted to an assignable injection time period (TQREAL), and a reference injection amount (QTRUE) of the reference fuel injection valve is converted to a reference injection time period (TQTRUE) of the reference fuel injection valve.

The above learning is performed in each of the plurality of high and low fuel pressures. Then, the learning value is obtained with respect to each cylinder and with respect to each fuel pressure.

When the learning execution condition in the Step S3 becomes unable to be satisfied (e.g., when the vehicle starts traveling) before the learning is completely finished, the PCM 200 interrupts the learning once, and will execute the remaining part of the learning when the learning execution condition in the Step S3 is re-satisfied.

(4) Functions

As above, an engine control apparatus according to this embodiment is designed to learn a characteristic of the fuel injection valve 20 (a relationship between an assignable injection time period (ms) to the fuel injection valve 20 and an actual injection amount (mm$^3$/st)) for use in fuel injection control for the engine 1, and comprises the following distinctive elements.

First, the alternator 2 configured to acquire a motive force from the engine 1 to generate electricity, and the capacitor 3 capable of storing therein the electricity generated by the alternator 2, are provided. In response to satisfaction of the requirement for execution of the learning, the PCM 200 of the in-vehicle electronic control system calculates an electricity consumption amount (Qo) required by the vehicle during execution of the learning in the Step S4, and compares an amount of electricity (Qc) stored in the capacitor 3 with the calculated electricity consumption amount (Step S1). When a result of the comparison indicates that the capacitor electricity amount is equal to or less than the calculated electricity consumption amount (Qc≤Qo), the PCM 200 operates to cause the alternator 2 to generate electricity until the capacitor electricity amount is increased beyond the calculated electricity consumption amount (Step S2). On the other hand, when the capacitor electricity amount is greater than the calculated electricity consumption amount (Qc>Qo), or when the capacitor electricity amount is increased beyond the calculated electricity consumption amount, as a result of electricity generation by the alternator 2 in the Step S2, and on the assumption that the learning execution condition is satisfied (YES in the STEP S3), the PCM 200 operates to learn the characteristic of the fuel injection valve 20 while using the capacitor electricity (Qc) so as to avoid the electricity generation by the alternator 2 (Step S4).

In this embodiment, before the learning in the Step S4 is executed, the electricity consumption amount (Qo) required by the vehicle during execution of the learning is ensured in the capacitor 3, so that, even when only electricity in the capacitor 3 is used during execution of the learning, the voltage of the capacitor 3 (from 12V to up to 25V) is never lowered beyond 12V as a minimum voltage of the battery 6. Therefore, the learning in the Step S4 is executed without performing electricity generation by the alternator 2, and thereby the engine 1 is reliably maintained in a no-load state during execution of the learning. Thus, during the learning, the engine 1 is reliably maintained in a stable state, so that learning accuracy is reliably enhanced.

The engine control apparatus according to this embodiment comprises the electricity supply system 100 in which the capacitor 3 is electrically connected to the electrical load 4 involving electricity consumption during execution of the learning in the Step S4, and the battery 6 serving as an electricity source. The electricity supply system 100 is configured such that electricity of the capacitor 3 is used in the electrical load 4, in priority to electricity in the battery 6. That is, it is configured such that, when electricity is supplied from the capacitor 3 to the electrical load 4, no electricity is supplied from the battery 6 to the electrical load 4. Thus, in combination with the configuration in which an electricity amount (Qc) greater than the electricity consumption amount (Qo) required by the vehicle during the learning is ensured in the capacitor 3, discharge of the battery 6 during learning can be avoided. Therefore, it becomes possible to prevent lowering of the SOC in the battery 6 during the learning to thereby suppress acceleration of degradation of the battery 6. The battery 6 is kept from being discharged during the learning and thereby the SOC in the battery 6 is not lowered during the learning, so that it becomes possible to realize a situation where electricity generation by the alternator 2 is not performed.

In this embodiment, the characteristic of the fuel injection valve 20 for use in fuel injection control for the engine 1 is accurately learned under the condition that the engine 1 is maintained in a stable state, so that engine performance such as exhaust gas emissions, fuel economy, drivability and NVH (Noise, Vibration and Harshness), is largely enhanced.

(5) Modifications

In the above embodiment, the alternator 2 is employed as an electricity generation device configured to acquire a motive force from the engine 1 to generate electricity. Alternatively, a motor generator capable of performing not only electricity generation but also torque assist for the engine 1 (an operation of giving an assisting torque to the output shaft 1a of the engine 1) may be employed. That is, the present invention is applicable to not only a normal type of vehicle equipped with only an engine as a drive source, but also to a hybrid vehicle equipped with a combination of an engine and a motor (motor generator).

In the above embodiment, an electric double layer capacitor (EDLC) is employed as a capacitor 3 capable of storing therein electricity generated by the alternator 2 (electricity generation device). However, the capacitor 3 is not necessarily limited to the electric double layer capacitor, but may be any other suitable type capable of repetitive charge-discharge and relatively rapid charge-discharge. For example, as a capacitor 3 other than the electric double layer capacitor, a lithium ion capacitor may be employed. In the lithium ion capacitor, a carbon-based material (the same material as that for a negative electrode of a lithium ion battery) capable of electrochemically storing therein lithium ions is used as a negative electrode to provide further enhanced energy density. Differently from the electric double layer capacitor commonly used as the capacitor 3, in the lithium ion capacitor having such a configuration, positive and negative electrodes are different from each other in terms of the principle of charge and discharge (a chemical reaction is used in combination). Therefore, the lithium ion capacitor is also called a hybrid capacitor. Each of the hybrid capacitor including the lithium ion capacitor as one example, and the electric double layer capacitor has a high energy density and a linear charge-discharge property, so that they may be suitably usable as the capacitor 3 in the present invention.

Although a target of the learning ("engine control-related component for use in engine control") in the above embodiment is the fuel injection valve 20, the target is not limited thereto. For example, a characteristic (individual difference and/or installation variation) of the crank angle sensor SW4 may also be learned to contribute to enhancing reliability of engine control. In this case, in view of suppressing torsion of the crankshaft 1a to enhance learning accuracy, it is preferable to maintain the engine 1 in a no-load state during the learning.

The present invention described as above will be outlined below.

The present invention provides an engine control apparatus for learning a characteristic of an engine control-related component for use in engine control. The engine control apparatus comprises: an electricity generation device configured to acquire a motive force from an engine to generate electricity; a capacitor capable of storing therein the electricity generated by the electricity generation device; an electricity consumption calculation device configured to calculate an electricity consumption amount required by a vehicle during execution of the learning; a comparison device configured to compare an amount of electricity stored in the capacitor with the electricity consumption amount calculated by the electricity consumption calculation device; a required electricity ensuring device configured to, when a result of the comparison by the comparison device indicates that the amount of electricity stored in the capacitor is equal to or less than the calculated electricity consumption amount, cause the electricity generation device to generate electricity until the amount of electricity stored in the capacitor is increased beyond the calculated electricity consumption amount; and a learning execution device configured to, when the result of the comparison by the comparison device indicates that the amount of electricity stored in the capacitor is greater than the calculated electricity consumption amount, or when the amount of electricity stored in the capacitor is increased beyond the calculated electricity consumption amount by the required electricity ensuring device, execute the learning while using electricity stored in the capacitor so as to avoid the electricity generation by the electricity generation device.

In the present invention, a capacitor capable of relatively rapid charge and discharge is provided, and electricity generated by the electricity generation device is stored in the capacitor. Then, an electricity consumption amount required by the vehicle during the learning of a characteristic of an engine control-related component for use in engine control is calculated, and, when the amount of electricity stored in the capacitor is greater than the calculated electricity consumption amount, the learning is executed while using electricity stored in the capacitor. On the other had, when the amount of electricity stored in the capacitor is equal to or less than the calculated electricity consumption amount, the electricity generation device is operated to generate electricity until the amount of electricity stored in the capacitor is increased beyond the calculated electricity consumption amount, and then the learning is executed while using electricity stored in the capacitor. In either case, an electricity greater than the electricity consumption amount required by the vehicle during the learning is ensured in the capacitor, so that the learning is executed without performing electricity generation by the electricity generation device. Thus, during execution of the learning, the engine is reliably maintained in a no-load state, i.e., the engine is reliably maintained in a stable state, so that learning accuracy is reliably enhanced.

Preferably, in the engine control apparatus of the present invention, the capacitor is electrically connected to an electrical load involving electricity consumption during execution of the learning, and a battery serving as an electricity source, wherein the engine control apparatus is configured to, when electricity is supplied from the capacitor to the electrical load, prevent a supply of electricity from the battery to the electrical load.

In this configuration, when electricity is supplied from the capacitor to the electrical load, no electricity is supplied from the battery to the electrical load, so that, in combination with the configuration in which an electricity amount greater than the electricity consumption amount required by the vehicle during the learning is ensured in the capacitor, discharge of the battery during learning can be avoided. Therefore, it becomes possible to prevent lowering of SOC in the battery during the learning to thereby suppress acceleration of degradation of the battery. The battery is kept from being discharged during the learning and thereby the SOC in the battery is not lowered during the learning, as mentioned above, so that it becomes possible to realize a situation where electricity generation by the alternator is not performed.

Preferably, in the engine control apparatus of the present invention, the engine control-related component is a fuel injection valve.

In this configuration, the characteristic of the fuel injection valve for use in fuel injection control is accurately learned under the condition that the engine is maintained in a stable state. Thus, engine performance such as exhaust gas emissions, fuel economy, drivability and NVH (Noise, Vibration and Harshness), is largely enhanced.

The present invention also provides an engine control method for learning a characteristic of an engine control-related component for use in engine control. The engine control method comprises: an electricity consumption calculation step of calculating an electricity consumption amount required by a vehicle during execution of the learning; a comparison step of comparing an amount of electricity stored in a capacitor with the calculated electricity consumption amount, wherein the capacitor is configured to store therein electricity generated by an electricity generation device configured to acquire a motive force from an engine to generate electricity; a required electricity ensuring step of, when a result of the comparison indicates that the amount of electricity stored in the capacitor is equal to or less than the calculated electricity consumption amount, causing the electricity generation device to generate electricity until the amount of electricity stored in the capacitor is increased beyond the calculated electricity consumption amount; and a learning execution step of, when the result of the comparison indicates that the amount of electricity stored in the capacitor is greater than the calculated electricity consumption amount, or when the amount of electricity stored in the capacitor is increased beyond the calculated electricity consumption amount as a result of the electricity generation by the electricity generation device, executing the learning while using electricity stored in the capacitor so as to avoid the electricity generation by the electricity generation device.

The engine control method of the present invention can also obtain the same functions as those of the aforementioned engine control apparatus.

This application is based on Japanese Patent Application Serial No. 2012-209784 filed in Japan Patent Office on Sep. 24, 2012, the contents of which are hereby incorporated by reference.

Although the present invention has been adequately and sufficiently described by way of example with reference to the accompanying drawings so as to express the present invention, it is to be understood that various changes and/or modifications will be apparent to those skilled in the art. Therefore, unless otherwise such changes or modifications depart from the scope of the present invention hereinafter defined, they should be construed as being included therein.

INDUSTRIAL APPLICABILITY

As described above, the present invention has industrial applicability in the technical field of an engine control apparatus and method for learning a characteristic of an engine control-related component for use in engine control.

The invention claimed is:

1. An engine control method for learning a characteristic of an engine control-related component for use in engine control, comprising:
   an electricity consumption calculation step of calculating an electricity consumption amount required by a vehicle during execution of the learning, the electricity consumption amount including an electricity amount required for executing the learning and an electricity amount for use in another general electrical load;
   a comparison step of comparing an amount of electricity stored in a capacitor with the calculated electricity consumption amount, wherein the capacitor is configured to store therein electricity generated by an electricity generation device configured to acquire a motive force from an engine to generate electricity, and capable of supplying the stored electricity as electricity required for executing the learning and electricity for use in the another general electrical load;
   a required electricity ensuring step of, when a result of the comparison indicates that the amount of electricity stored in the capacitor is equal to or less than the calculated electricity consumption amount, causing the electricity generation device to generate electricity until the amount of electricity stored in the capacitor is increased beyond the calculated electricity consumption amount; and
   a learning execution step of, when the result of the comparison indicates that the amount of electricity stored in the capacitor is greater than the calculated electricity consumption amount, or when the amount of electricity stored in the capacitor is increased beyond the calculated electricity consumption amount as a result of the electricity generation by the electricity generation device, executing the learning while compensating the entire calculated electricity consumption amount only by electricity stored in the capacitor so as to avoid the electricity generation by the electricity generation device, wherein the capacitor is electrically connected to an electrical load involving electricity consumption during execution of the learning, and a battery serving as an electricity source, and wherein the method further comprising preventing a supply of electricity from the battery to the electrical load, when electricity is supplied from the capacitor to the electrical load.

2. An engine control apparatus for learning a characteristic of an engine control-related component for use in engine control, comprising:

an electricity generation device configured to acquire a motive force from an engine to generate electricity;

a capacitor capable of storing therein the electricity generated by the electricity generation device, and supplying the stored electricity as electricity required for executing the learning and electricity for use in another general electrical load;

an electricity consumption calculation device configured to calculate an electricity consumption amount required by a vehicle during execution of the learning, the electricity consumption amount including an electricity amount required for executing the learning and an electricity amount for use in the another general electrical load;

a comparison device configured to compare an amount of electricity stored in the capacitor with the electricity consumption amount calculated by the electricity consumption calculation device;

a required electricity ensuring device configured to, when a result of the comparison by the comparison device indicates that the amount of electricity stored in the capacitor is equal to or less than the calculated electricity consumption amount, cause the electricity generation device to generate electricity until the amount of electricity stored in the capacitor is increased beyond the calculated electricity consumption amount; and a learning execution device configured to, when the result of the comparison by the comparison device indicates that the amount of electricity stored in the capacitor is greater than the calculated electricity consumption amount, or when the amount of electricity stored in the capacitor is increased beyond the calculated electricity consumption amount by the required electricity ensuring device, execute the learning while compensating the entire calculated electricity consumption amount only by electricity stored in the capacitor so as to avoid the electricity generation by the electricity generation device, wherein the capacitor is electrically connected to an electrical load involving electricity consumption during execution of the learning, and a battery serving as an electricity source, and wherein the engine control apparatus is configured to, when electricity is supplied from the capacitor to the electrical load, prevent a supply of electricity from the battery to the electrical load.

3. The engine control apparatus as defined in claim 2, wherein the engine control-related component is a fuel injection valve.

4. The engine control apparatus as defined in claim 3, wherein the learning is configured to learn a characteristic of the fuel injection valve by performing fuel injection when the engine is in an idling state and in a no-load state, using a learning-only injection pattern in which a required injection amount is equally divided by the number of injection stages.

* * * * *